United States Patent [19]
Mast et al.

[11] 3,968,997
[45] July 13, 1976

[54] FEED MATERIAL HANDLING APPARATUS

[75] Inventors: Aquila D. Mast; Jean Paul Lyet, II, both of Lancaster, Pa.

[73] Assignee: Sperry Rand Corporation, New Holland, Pa.

[22] Filed: Jan. 12, 1970

[21] Appl. No.: 2,017

[52] U.S. Cl. .................................. 302/37; 302/38
[51] Int. Cl.² .................................. B65G 53/08
[58] Field of Search ............. 146/107; 302/4, 8, 11, 302/12, 37, 38

[56] References Cited
UNITED STATES PATENTS

| | | | |
|---|---|---|---|
| 750,865 | 2/1904 | Lamb et al. | 302/37 X |
| 1,825,838 | 10/1931 | Wessman | 302/37 X |
| 2,405,695 | 8/1946 | Hitchcock | 302/37 |
| 2,639,949 | 5/1953 | Zollars et al. | 302/37 |
| 2,717,812 | 9/1955 | Eglitis | 214/17 DB |
| 2,812,613 | 11/1957 | Schutz | 302/37 |
| 3,302,978 | 2/1967 | Scarnato et al. | 302/37 |
| 3,594,047 | 7/1971 | Pucher | 302/37 |
| 3,671,077 | 6/1972 | Hoyt et al. | 302/8 |

FOREIGN PATENTS OR APPLICATIONS

| | | | |
|---|---|---|---|
| 1,076,934 | 6/1957 | Germany | 302/37 |
| 294,221 | 6/1963 | Netherlands | 302/37 |
| 6,514,561 | 5/1967 | Netherlands | 302/37 |

Primary Examiner—Evon C. Blunk
Assistant Examiner—Jeffrey V. Nase
Attorney, Agent, or Firm—Frank A. Seemar; John R. Flanagan; Joseph A. Brown

[57] ABSTRACT

The feed material handling apparatus has a frame vertically supporting a feed material blower with an upwardly extending transition discharge member and horizontally supporting an impeller with a rotor for delivering feed material to the blower. The blower discharges the material upwardly through the transition member. In the two forms of the horizontal impeller the rotor turns clockwise in one and counterclockwise in the other. The frame is mounted on detachable wheels.

12 Claims, 13 Drawing Figures

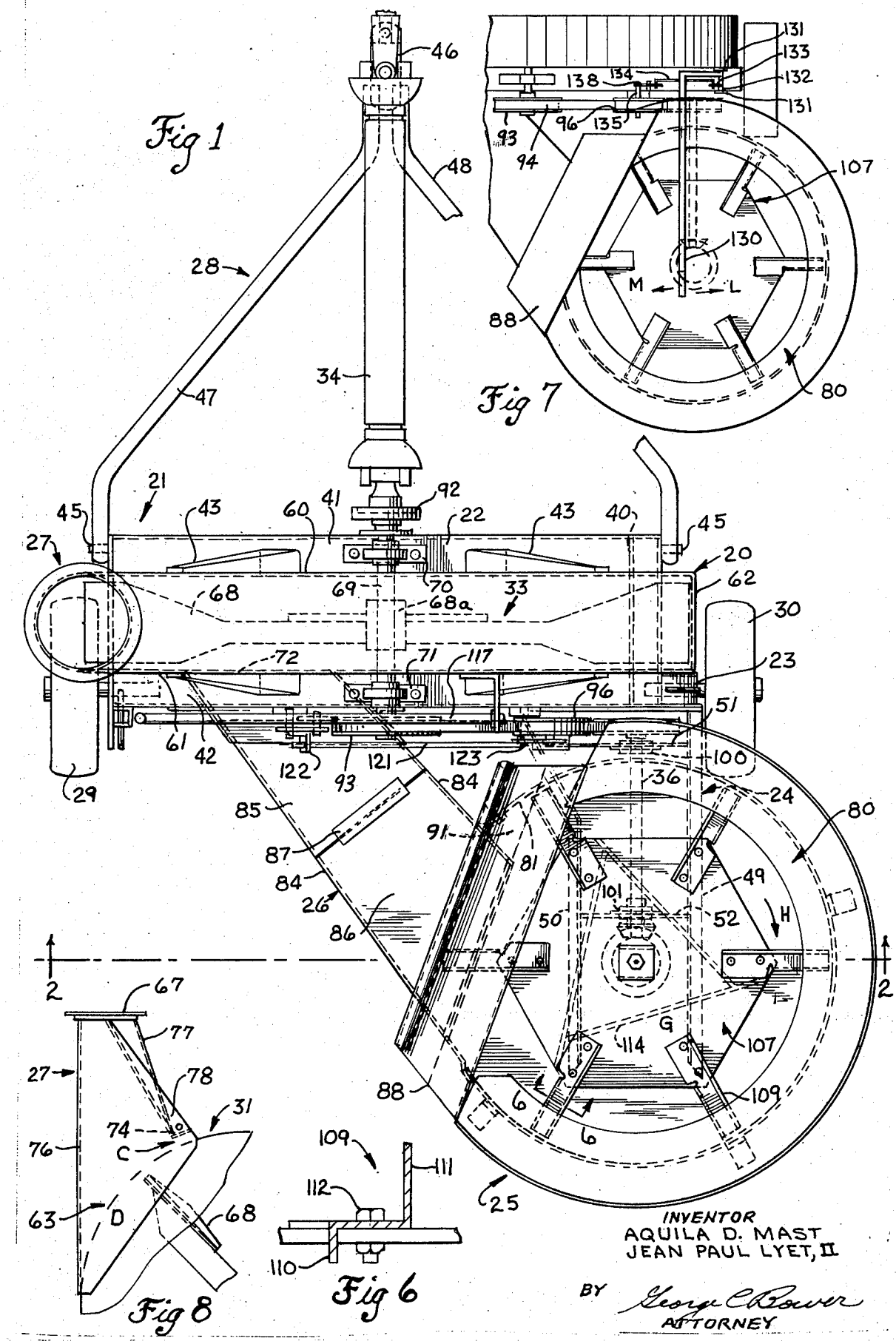

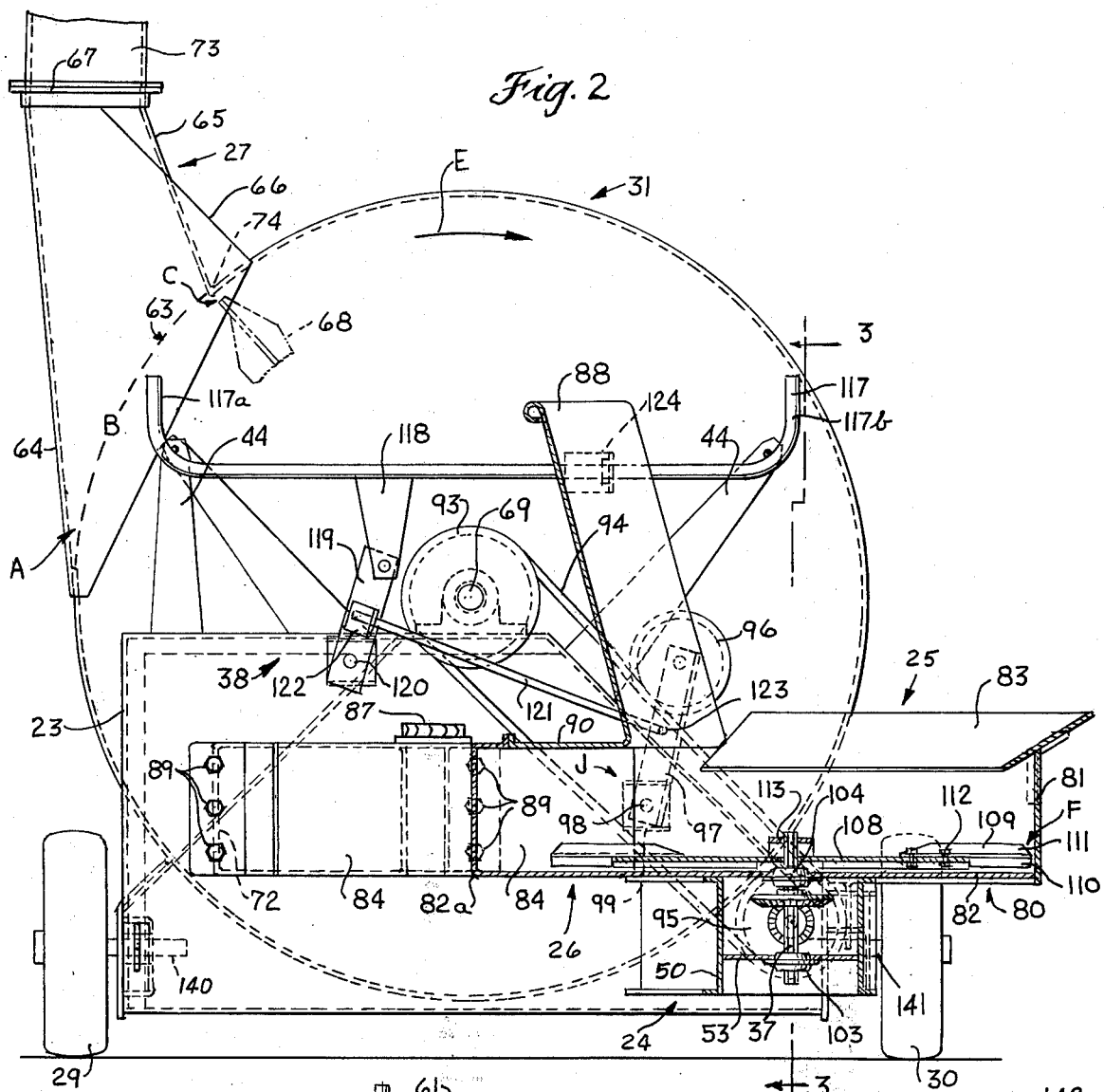
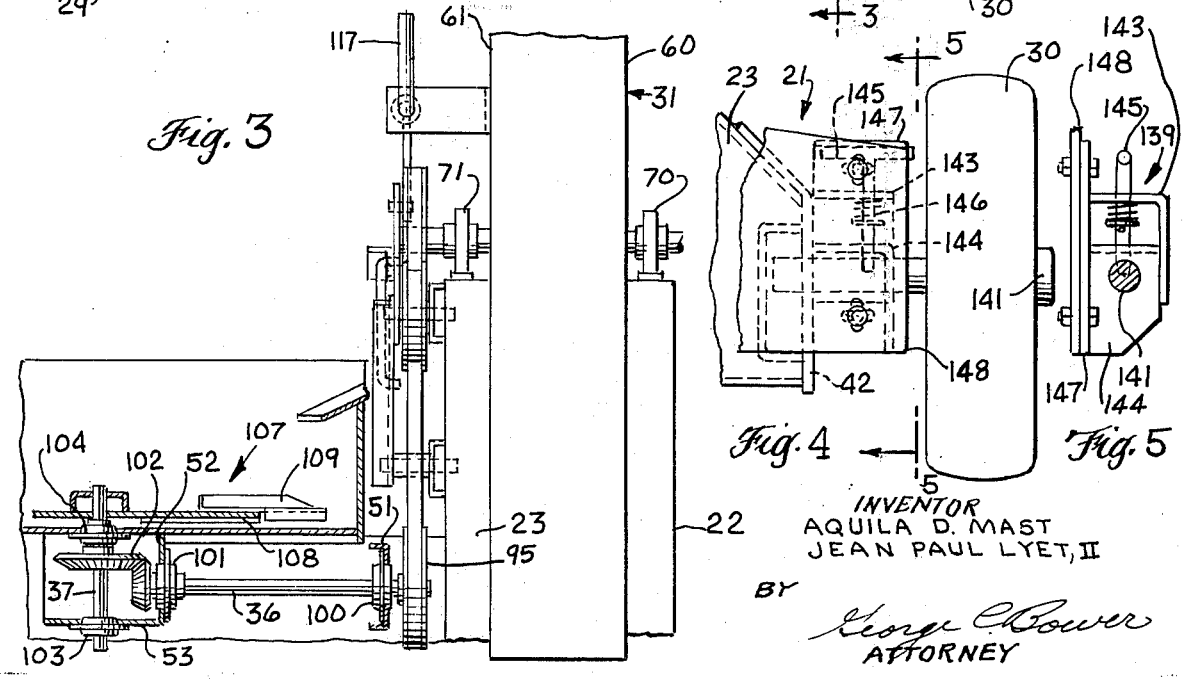

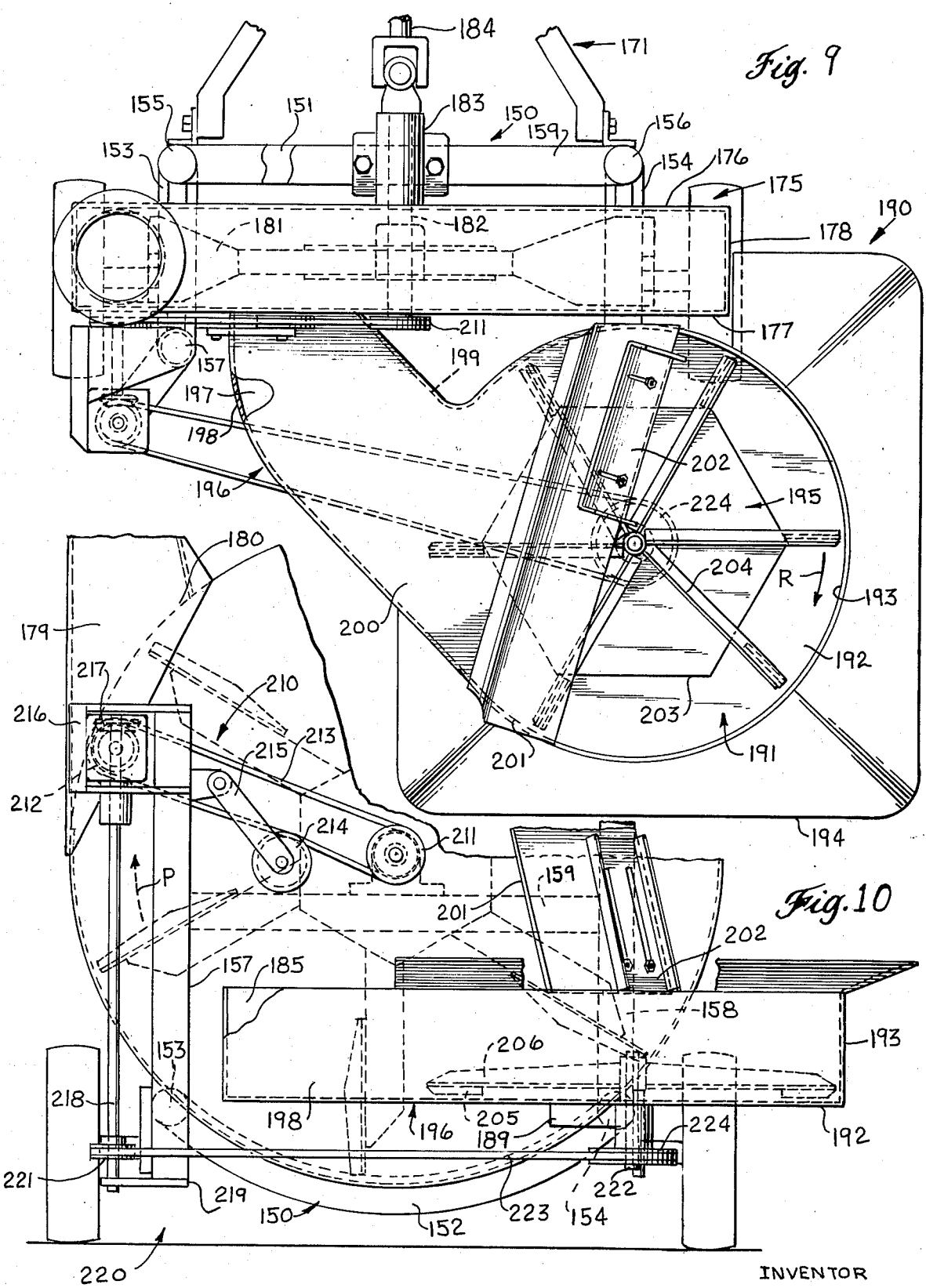

INVENTOR
AQUILA D. MAST
JEAN PAUL LYET, II

BY

*George C. Bower*

ATTORNEY

FEED MATERIAL HANDLING APPARATUS

BACKGROUND OF THE INVENTION

This invention relates to crop material handling apparatus and is directed particularly to the delivery of feed material to a blower or vertical impeller means.

Crop material is stored in a chopped condition in silos, bunkers or the like. The chopped crop material is delivered to the top of the silo by a forage blower at ground level. The blower is usually driven by a power take-off from a tractor and the crop or feed material is delivered to the blower by auger means of conveyor means. The blower receives the chopped crop and discharges it through a vertically extending transitioned member which delivers the chopped crop to a long vertical conduit or pipe with a curved spout on the top for dropping the chopped crop into the silo.

The shortcoming of the present forage blowers is the large amount of power required for the amount of crop material lifted to the top of the silo. The uneven and noisy operation of the blower is due to the delivery of large clumps of crop material to the blower which the blower must break up in order to discharge it upwardly through the transition member and to the closeness of the shear bar to the pitch circle of the blades of the blower. Another disadvantage is that with the conventional auger type feed, the forage wagon can be unloaded into the auger at a single position of the wagon in relation to the forage blower. This restriction often makes it impossible to properly place the forage blower and the forage wagon for best transferance of the chopped crop and convenience of operation. Some forage blowers have long auger and conveyor means. These add to the size and cost of the blower without providing the desired versatility of positioning of the forage wagon.

It is, therefore, the purpose of this invention to provide a forage blower that substantially increases the amount of crop of feed material handled for a given power input, operates more smoothly and quietly than present forage blowers and may receive feed material from a forage wagon over a range of relative positions.

OBJECTS AND SUMMARY OF THE INVENTION

An object of this invention is to substantially increase the amount of crop or feed material discharged by a forage blower for a given power input.

Another object of the invention is to improve the convenience of operation of the feed material handling apparatus.

Another object of this invention is to provide a feed material handling apparatus that operates smoothly and more quietly.

Another object of this invention is to provide a feed material handling apparatus that does not feed large chunks or excessive amounts of crop material to the blower.

Another object of this invention is to provide a more versatile positioning of the forage wagon in relation to the forage blower.

Another object of this invention is to provide an improved feed material handling apparatus that does not cost more than the present feed material handling apparatuses.

In summary the feed material handling apparatus comprises a large vertical blower, a horizontal rotor type impeller with a hopper and rotor for receiving chopped feed material and delivering it to the blower in a generally airborne state.

Other and further objects and advantages of this invention will be apparent from the following specification and depending claims taken in connection with the drawings which illustrate various embodiments of the invention.

BRIEF DESCRIPTION OF THE DRAWINGS

FIG. 1 is a top view of one embodiment of the feed material handling apparatus.

FIG. 2 is an end view of the feed material handling apparatus of FIG. 1 with the impeller shown in section lines 2—2 of FIG. 2.

FIG. 3 is a fragmentary view of the apparatus with the hopper shown in section taken along lines 3—3 of FIG. 2.

FIG. 4 is a fragmentary front view of the detachable mounting for the right wheel.

FIG. 5 is an end view of the detachable mounting taken along lines 5—5 of FIG. 4.

FIG. 6 is a sectional view of the paddles on the rotor support plate taken along lines 6—6 of FIG. 1—1.

FIG. 7 is a fragmentary top view of the apparatus to illustrate the preferred form of linkage means to control delivery of power to the horizontal impeller.

FIG. 8 is a fragmentary view of the casing for the blower to illustrate the preferred form of the transition member to the vertical pipe.

FIG. 9 is a top view of another embodiment of the invention.

FIG. 10 is a fragmentary hopper end view of the embodiment of FIG. 9.

DETAILED DESCRIPTION OF THE INVENTION

First Embodiment—Introduction

Figure 11:
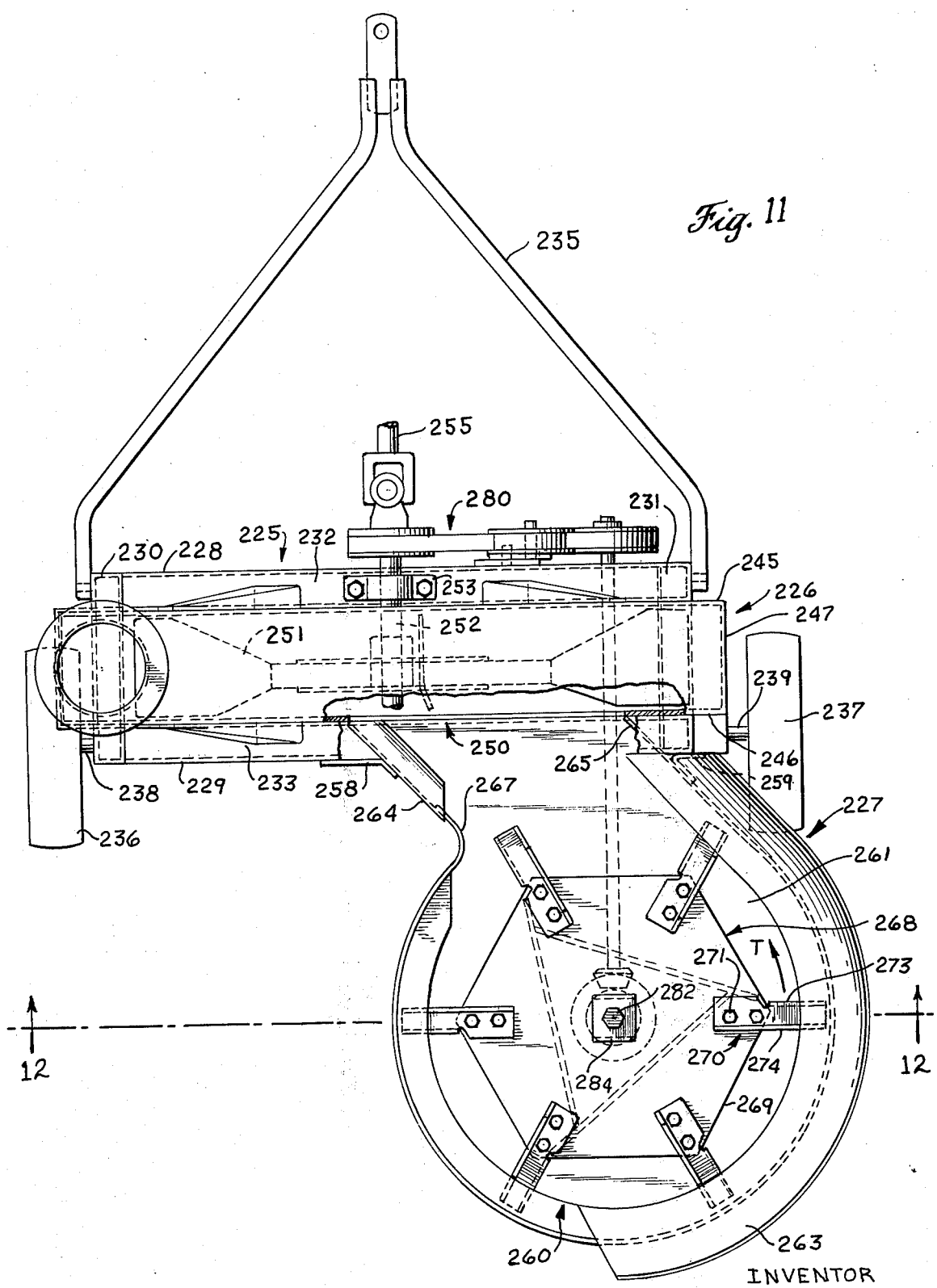
FIG. 11 is a top view of the apparatus illustrating another embodiment of the apparatus with the hopper rotor turning counterclockwise.

The feed material handling apparatus of FIGS. 1–8 has a blower or vertical rotor type impeller 20 mounted between front panel 22 and rear or entrance panel 23 of the frame 21. A frame extension or beam 24 projects rearwardly from the rear panel 23 on the right side of the apparatus to support the horizontal rotor type impeller 25 connected to the feed material transfer means 26 which extends through rear panel 23 for delivering feed material thrown by the rotor 107 through the opening 72 in the rear side wall 61 of the blower. The frame has detachable wheels 29 and 30 at opposite ends for movably supporting the apparatus. A hitch 28 is pivotally mounted on the front panel 22 for connecting the apparatus to a tractor or truck. The fan 33 of the blower is driven by means of the power take-off 34. The rotor 107 is driven by means of the belt and pulley drive and shafts 36 and 37. The control mechanism 38 shifts the belt and pulley drive in and out of driving condition so that the impeller may be stopped while the fan is rotating. The feed material delivered to the blower by the horizontal rotor type impeller 25 is discharged out of the blower through the transition member 27 mounted on the casing blower 31.

Frame

The main frame of the apparatus comprises the front panel 22 and the rear panel 23 connected at the bottom by pieces 40 welded to the bottom portions of the flanges 41 and 42 at right angles to the panels and extending therearound. The blower casing 31 is connected to the panels 22,23. The frame 21 has front supports 43 extending upwardly from the flange 41 and rear supports 44 extending up from the flange 42 to brace the front and rear sides of the blower and provide a firm mounting for the vertical blower in the frame. The hitch 28 is pivotally connected to the front panel 22 by the pins 45 on opposite ends of the panel 22 which pass through the rear ends of left and right hitch shafts 47 and 48. The shafts 47 and 48 are bent to converge at a forward clevis 46 for connection to a tractor.

At the rear the frame extension or beam 24 extends perpendicular to the rear panel 23 and comprises rearwardly extending beams, 50. The beam 50 is at an angle to the rear panel 23 and converges rearwardly towards the beam 49 which is perpendicular to the panel 23. Vertical cross pieces 51 and 52 extend between the beams as well as the horizontal cross piece 53 which is spaced downwardly from the feed table 82.

Blower

The blower casing 31 comprises circular front side wall 60 and circular rear side wall 61 and a band or wrapper 62 extending around the peripheries of the wall 61. The band or wrapper has an opening 63 in the second quadrant viewing the apparatus from the rear. A transition discharge member 27 extends upwardly from this opening to connect the blower to vertical conduits 73 mounted on the flanged ring 67 of the transition member. The transition member 27 as shown in FIG. 2 has a leading side member 64 and a trailing side member 65. The members are shaped to conform to the casing at their lower ends and to gradually change into a cylindrical shape at the flanged ring 67. Brace members or plates 66 are mounted on opposite sides of the blower and transition member and secured to the sides 60,61, respectively, and the opposite sides of the transition member to provide a rigid support for the transition member. As shown in FIG. 2 the side member 64 is bent outwardly at a small acute angle A from the tangential plane to the blower. The opening 63 extends over an arc B with the inner edge between the band 62 and the side member 65 spaced a distance C from the tip or pitch circle of the blade 68 of the fan 33.

In FIG. 8 a preferred form of a transition member 27 is shown in which the leading side member 76 extends upwardly along the plane tangential to the casing 31. The trailing side member 77 completes the transition member. These side members are shaped to change from the cylindrical shape of the band 62 to the circular shape of the flanged ring 67. Brace members 78 are provided on opposite sides of the blower and transition member to form a rigid structure. The trailing edge 74 is spaced a distance C from the paddles 68 of the fan. The distinguishing feature of this transition member from the one shown in FIG. 2 is the length of the opening 63. In this embodiment the opening 63 extends over a substantially greater arc D than the arc B of the form shown in FIG. 2. The distance C is several times the clearance of a blade and a shear block and the arc D is in the order of two-thirds of a quadrant. A distinguishing feature of both of these embodiments is the elimination at the edge 74 of the shear block on the present blowers and the greater spacing C from the edge 74 so that the blade 68 has substantial clearance. This clearance substantially reduces the noise of the blower. The shear block is not required since the horizontal impeller does not feed large chunks of material. This is more fully explained in connection with the description of the horizontal rotor type impeller. This eliminates any large chunks of crop material from entering the blower thus the blower does not need to pick up these chunks against a shear block.

The fan 33 comprises a plurality of radially extending blades 68 mounted by the hub 68a on the shaft 69. The shaft 69 is rotatably mounted in the bearings 70 and 71 mounted on the flanges 41 and 42, respectively. As indicated by the arrow E in FIG. 2 the fan rotates in a clockwise direction when viewed from the rear. In referring to quadrants of the blower will be made from a rearward view of the blower. The feed opening 72 is in the third quadrant and the discharge opening 63 is in the second quadrant.

Horizontal Impeller

The horizontal rotor type impeller comprises a hopper 80 with a cylindrical hopper wall 81 and a circular hopper feed table 82 and a circular cone shaped member 83 extending outwardly and inwardly above the side wall 81 for guiding feed material into the hopper. The rotor 107 includes a support plate 108 mounted on the shaft 37, the upper end of shaft 37 passing through a U-shaped bracket on the upper surface of the plate 108. Radially extending blades 109 are circumferentially spaced around the periphery of the support plate 108. The support plate 108 is of a hexagonal shape and spaced a distance F from the wall 81. The six blades are, respectively, mounted at six corners of the supporting plate and are secured thereto by fastening means 112. The inner ends of the blade are diametrically spaced a distance G to provide a substantial area on the upper surface of the plate 108 that is clear. The generally Z-shaped blades extend radially and have upwardly extending flanges 111 along the trailing edge and downwardly extending flanges 110 along the leading edges. The blades extend radially outwardly to the cylindrical hopper side wall 81. The rotor turns in the direction H so that crop or feed material thrown by the blades is projected through the transfer means 26. The crop material is dropped on top of the spinning support plate and thrown outwardly into the path of the blades 109 which impel the material through the transfer means 26 into the blower in a disintegrated airborne condition.

On the underside of the support plate 108 are wiping strips 114. In this embodiment three wiping strips are shown and each extend from the periphery of the support plate across the plate to the side of the center of rotation to connect with another wiping strip. The wiping strips form a triangular structure and clear the space underneath the plate 108 and above the table 82 so that material will not accumulate underneath the rotor. The support plate is spaced a distance F from the side wall to prevent material from lodging between the support plate and side wall and provide room for the downwardly extending flanges 110 of the blades 109.

The hopper side wall extends upwardly from the feed table to provide an initial feed opening over the rotor 107 so that feed material may be dropped through the feed opening directly onto the rapidly rotating support plate.

A baffle 88 extends across the hopper along thee discharge side of the horizontal impeller. The lower portion of the baffle 88 is at the level of the top edge of the hopper side wall 81. As illustrated in FIG. 1 the blades 109 pass underneath the baffle 88. The height J between the lower edge of the baffle 88 and the feed table 82 catches oversize pieces and prevents them from being delievered to the blower and helps break them up into smaller sizes.

Feed Material Transfer Means

The feed material transfer means 26 comprises the feed table extension 82a which is at the same level as the feed table 82, side walls 84, top wall 85, and cover 86 which is secured to the top wall 85 by hinge 87. The walls and table form a tapered passage of a rectangular cross-section. The transfer means extends at an angle to the blower 20 to introduce the feed material at an acute angle in the direction of rotation of the blade 68. The feed opening is in the rear side wall 61. The transfer means passes through the rear panel 22 and the angular side walls 84 are fastened to the rear panel 22 by fastening means 89 as illustrated in FIG. 2.

As best illustrated in FIG. 1 the transfer means 26 has the side walls converging towards the blower. This is to provide ample area for the entrance of air and crop material into the transfer means and to the blower. The opening 72 should be larger than the area of the opening formed by the flanged ring 67 or the cross sectional area of the vertical conduit. In connection with the air supply, the cover 86 and the flange 90 attached to the hopper and supporting the baffle 88 form a triangular shaped opening 91 with the wall 81 of the hopper to supply air to the transfer means. If the crop material is unloaded too rapidly it can fill the hopper and cut off or substantially reduce the flow of air through the opening formed by the flange 90, feed table 82 and the side wall 81 of the hopper. In this situation the opening 91 provides air for proper operation of the blower.

Drive for Horizontal Rotor Type Impeller

The rotor 107 is driven from the power take-off shaft 34 connected to the tractor through the shear plate hub 92, the fan shaft 69 to the drive pulley 93 on the shaft 69. A belt 94 connects the pulley 93 to the driven pulley 95 mounted on the shaft 36. The shaft 36 is mounted in bearings 100 and 101 and drives the vertical shaft 37 through the bevel gears 102. The vertical shaft 37 rotates the rotor 107. The driven shaft 37 is rotatably mounted in bearings 103 and 104 mounted in the horizontal cross piece 53 and the feed table 82, respectively.

The belt is loosely mounted on the pulleys 93 and 95 and does not drive pulley 95 unless the belt is placed under tension by the idler pulley 96. As shown in FIG. 2, the idler pulley 96 is rotatably mounted on the idler pulley arm 97 which is mounted on the pivot pin 98 in the bracket 99 on the side 61 of the blower. The control handle 117 of the control mechanism 38 extends parallel to the side 61 and is slidably mounted in a bracket 124. Upstanding ends 117b, 117a are, respectively, provided at the right periphery of the wrapper 62 and at the transition member 27 for actuation of the lever 119 from either side of the apparatus. A projection 118 extends downwardly from an intermediate point of the control handle 117 and is pivotally connected to the lever 119. The lever 119 is pivotally mounted on the pivot 120 at the opposite end from the projection 118. A rod 121 is adjustably attached to the bracket 122 on the lever 119 and intermediately hooks into the arm 97 by the hook 123 on the rod 121. Movement of the handle 117 to the left draws the idler pulley 96 against the belt and the rotor 107 rotates. Movement to the right relieves the tension and the rotor 107 stops. The projection 118 and the lever 119 can pass dead center so that the control mechanism 38 is held in the drive position.

In FIG. 7 the preferred embodiment of the control mechanism is shown in which the control lever 130 extends over the hopper and the center of rotation of the rotor 107. The control lever 130 is of an L-shape with a portion extending downwardly and parallel to the blower. This portion is rigidly fastened to the pivot 132 rotatably mounted in the brackets 131 at opposite ends of the pivot 132. The brackets 131 are mounted on the flange 42 of the side panel 23. An arm 133, also rigidly mounted on the pivot 132, is connected by the link 134 to the idler arm 135 of the idler pulley 96. The idler arm 135 pivotally mounts the idler pulley on the frame. To press the idler pulley 96 against the belt, the lever 130 is drawn in the direction L away from the baffle 88 and towards an operator standing to the side of the hopper 80. The pulley 96 is moved to a disengaging position by movement of the lever 130 in the opposite direction M. The lever 130 is more accessible from different positions to start and stop the rotor. The link 138, arm 135 may be moved past dead center to hold the idler pulley 96 in the driving position so that it is not necessary to hold the control lever 130 to operate the apparatus.

Wheel Mountings

The wheels 29 and 30, which are rotatably mounted on shifts 140,141, respectively, are detachably mounted to the frame 21 by the wheel mounting indicated generally at 139. In FIGS. 4 and 5 the mounting 139 of the right wheel is shown in detail. The shaft 141 extends through the L-shape bracket 144 and the flange 42. The L-shaped member 144 is mounted on the plate 147 which is adjustably fastened to the plat 148 secured to the side panel 23. The L-shaped plate 143 is at right angle to the plate 144 and is also secured to the plate 147 and also to the L-shaped plate 144. The T-shaped pin 145 extends through the brackets 143 and 144 to fit into the recessed shaft 141 to lock th shaft in the main frame 21. The spring 146 presses the pin into the recess. By lifting the T-shaped pin 145 the shaft 141 can be pulled out of the mounting 139.

Modification of FIGS. 9 and 10

In FIGS. 9 and 10 a modification of the apparatus is shown and comprises a tubular frame 150, a blower or vertical rotor type impeller 175 and a horizontal rotor type impeller 190. The frame 150 comprises two bottom curved pieces 151 and 152 and spaced in parallel relation. The pieces are connected by tubular pieces 153 and 154 connecting the ends of the curved pieces 151,152. On the tractor side straight tubular pieces 155,156 extend upwardly from the ends of the curved piece 151 and are connected adjacent the center of the blower by the straight piece 159. On the rear side of the blower tubular piece 157 extends upwardly from the left end of the curved piece 152 and a shorter tubular piece 158 extends upwardly and parallel relation with the piece 157. The blower 175 is vertically mounted between the vertical tubular pieces 155,156,157,158. A hitch 171 is pivotally connected to the frame 150 for drawing the apparatus by a tractor.

The blower 175 has two circular side walls 176 and 177 and a cylindrical shaped band 178 extending around the peripheries of the wall 176, 177 for forming the casing for the blower. The band 178 has an opening 180 for passing discharged crop material. A transition member 179 is mounted on the casing and extends upwardly for connection to the vertical conduits, not shown. The six blades 181 are secured to the shaft 182 which is rotatably mounted in the bearing 183 mounted on the intermediate cross piece 159 of the frame 150. The shaft 182 is connected to the power take-off 184 for rotation of the fan in a clockwise direction viewed from the rear as indicated by the arrow P.

The horizontal rotor type impeller 190 is supported by a beam 189 secured to the main frame 150 and carries a material transfer means 196 which is suitably attached to the side wall 177 at feed opening 185. The horizontal impeller 190 comprises a hopper 191 with a feed table 192 and a cylindrical shaped side wall 193. A rim 194 flares upwardly and outwardly from the upper edge of the cylindrical wall 193 to direct the crop material into the hopper 191. A rotor 195, which is disposed above the feed table 192 has an hexagonal shaped support plate 203 with blades 204 extending from the center of the rotor generally radially outwardly to cylindrical side wall 193. The rotor is mounted on shaft 222 and is rotated in a clockwise direction when viewed from the top as indicated by the arrow R. The shaft 222 is driven from the fan shaft 182 by the first belt and pulley drive, indicated generally at 210, shaft 218 second and belt and pulley drive, indicated generally at 220. The first belt and pulley drive 210 comprises a drive pulley 211 mounted on shaft 182, a belt 213 and a driven pulley 212. When the belt 213 is loose the pulley 212 is not driven. The idler pulley 214 mounted on the linkage 215 places the belt 213 under tension to drive the rotor 195. The shaft 218 is connected to the belt and pulley drive 210 through bevel gear 217 mounted in the mounting 216 attached to the vertical tubular piece 157. The lower end of shaft 218 is rotatably mounted in the plate 219 supported by the tubular piece 157. The pulleys 221 and 224 are mounted on shafts 218 and 222, respectively, with the belt 223 drivingly coupling the two pulleys.

The material transfer means 196 extends tangentially from the hopper 191 and at an angle to the blower 175 to deliver the crop material discharged by the rotor 195 to the feed opening 185 for delivery to the fan. The material transfer means has a table extension 197, side walls 198,1999 and a cover 200 which extends substantially half-way across the hopper 191. A baffle 201 extends upwardly at an angle over the cover 200 to direct crop material impinging thereon into the hopper 191. A baffle extension 202 is disposed over the rotor 195 to the side of the shaft 222 as the blades 204 emerge from underneath the cover 200. The blades 204 extend from the center of the rotor to the side wall 193 and have an upper flange 206 extending the full length of the blade and a downwardly extending flange 205. The flange 205 is positioned between the periphery of the support plate 203 and the wall 193.

Figure 12:
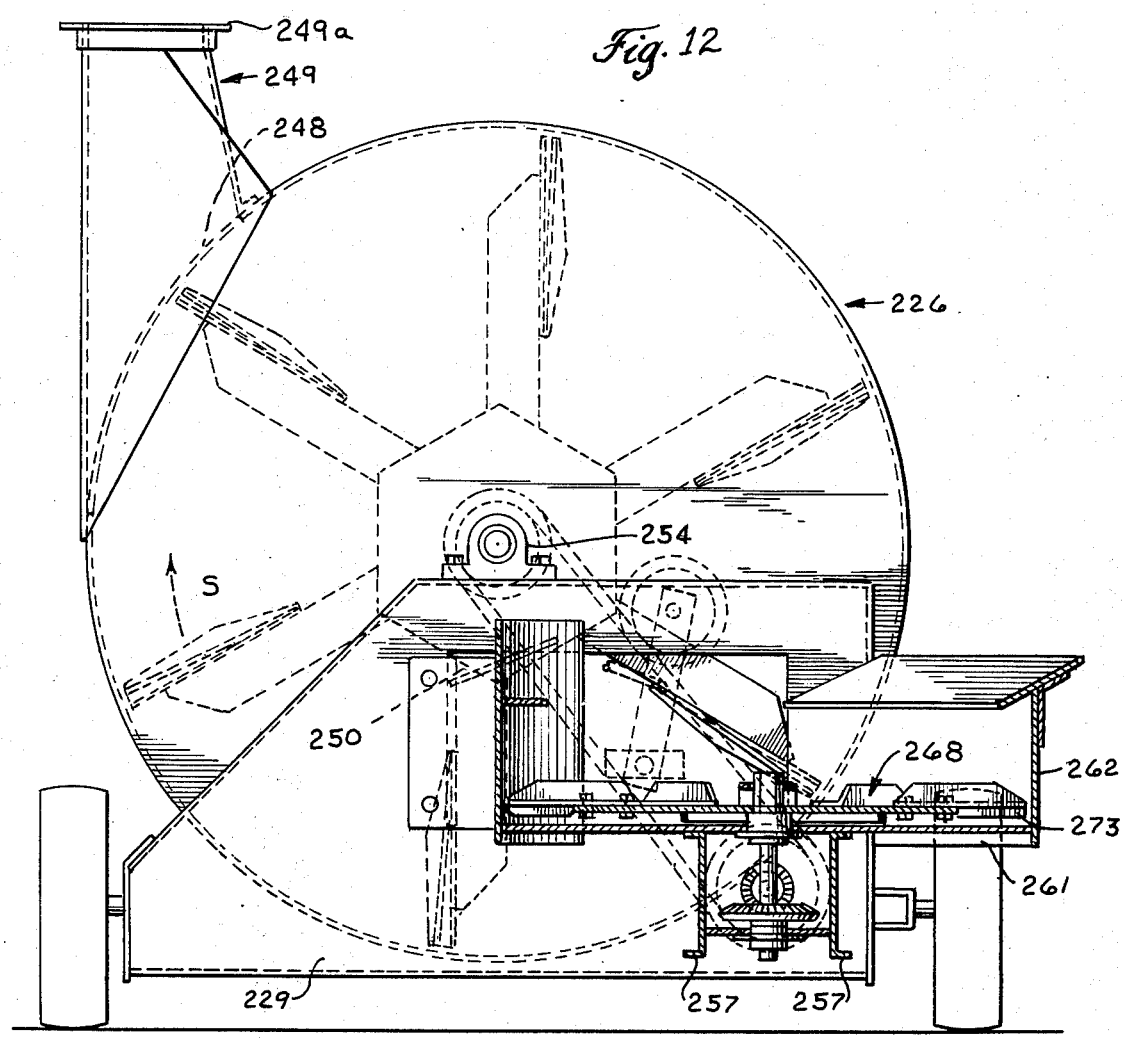
FIG. 12 is a hopper end view of the embodiment of FIG. 11 with the hopper shown in section along lines 12—12 of FIG. 11.
Figure 13:
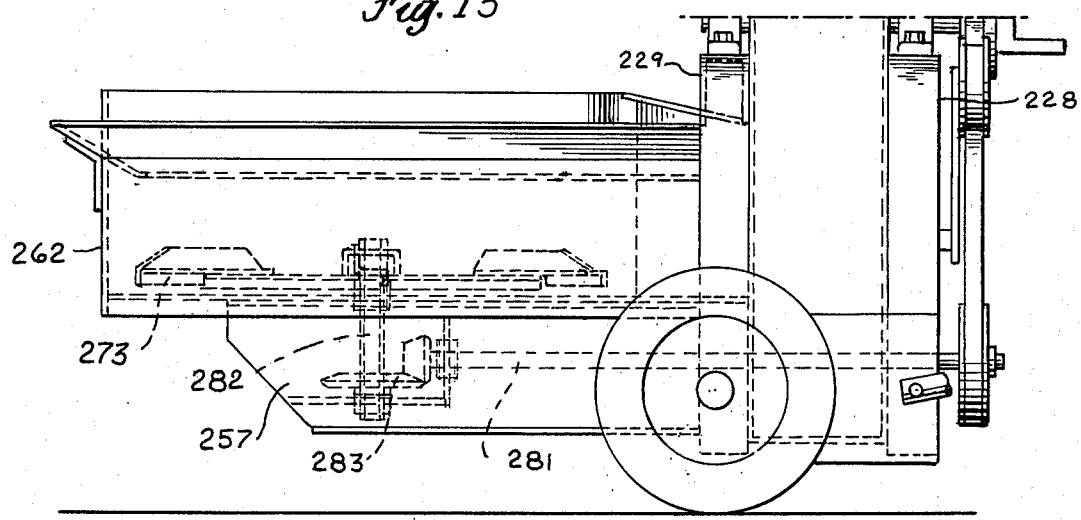
FIG. 13 is a right side view of the embodiment of FIG. 11.

Apparatus of FIGS. 11–13

In FIGS. 11–13 another form of the apparatus is illustrated and comprises a frame 225, a blower 226 and a horizontal rotor type impeller 227. The frame 225 is substantially the same as the main frame of the embodiment shown in FIGS. 1 and 2 and comprises front and rear panels 228,229 connected at the bottom by straps 230,231. Flanges 232 and 233 extend around the side panel 228, 229, respectively. Both of the side panels have a generally triangular configuration with the top portions of the flanges horizontal for supporting the bearings 253 and 254, respectively. A hitch 235 is pivotally connected to the lower portion of the front panel 228. Wheels 236,237 are rotatably mounted on the frame 225 by the shaft 238 and 239.

The blower 226 comprises the front and rear side walls 245,246 of a circular configuration and a band or wrapper 247 extending around the peripheries of the sides 245,246 and forming the discharge opening 248 for passing crop material into the transition member 249 for delivery to the vertical conduits fastened to the flanged ring 249a. The fan is formed by the blades 251 mounted on the shaft 252 rotatably mounted in the bearings 253,254. The shaft 252 is driven by the power take-off 255 connected to the tractor.

As in the embodiment of FIGS. 1 and 2, the horizontal rotor type impeller 227 is supported by a rearward frame extension or beam 257 rigidly secured to the rear panel 229. The horizontal impeller comprises the hopper 260 with the bottom feed table 261 and the upwardly extending cylindrical shaped side walls 262. The feed table 261 extends to the feed opening 250 in the rear side 246 of the blower and forms with the straight walls 264,265 the material conveying means from the horizontal impeller to the blower. The walls 264,265 are secured to the rear panel by means of brackets 258,259, respectively. The wall 264 and the side wall 262 are joined by the rounded corner 267. The cone-shaped lip 263 on the upper edge of the side wsll 262 guides the crop material into and onto the rotor 268. The rotor comprises a support plate 269 with six radially extending blades 270 bolted to the top of the support member by the bolts 271. The inner ends of the blades 270 are diametrically spaced and provide a free area around the center of the support plate for receiving crop material. The blades have a downwardly extending flange 273 fitting between the periphery of the support member 268 and the side wall 262. An upwardly projecting flange 274 extends along the opposite edges of the blade. The rotor 268 turns in a counterclockwise direction as indicated by the arrow T (FIG. 11) when viewed from above. The wall 265 is tangential to the cylindrical wall 262 for a smooth transferance of the crop material from the hopper to the material conveying means. In this embodiment, the opening 250 is in the fourth quadrant of the blower as viewed from the rear so that the crop material travels further within the blower for discharge to the opening 248.

The rotor 268 is driven by the power take-off shaft 255 through the belt and pulley 280 drive on the front panel 228, shaft 281 ending rearwardly parallel to the beam 256 and the shaft 282 vertically mounted and rotatably supported by the feed table 261 (FIG. 12) and the beam 257. The shaft 281, 282 are coupled by the bevel gearing 283. The U-shaped bracket 284 is securely fastened to the support plate 269 and the shaft 282.

Summary of Features and Advantages

The feed material handling apparatus is mounted on wheels 29,30 for positioning the apparatus at any desired location to blow chopped crop and feed material into a vertical silo or into lower bunks and bins. The usual operating position of the transition member is vertical as shown in the drawings. However, the band or wrapper may be turned on the side wall to tilt the transition member at an acute angle to the horizontal so that the conduits extending from the transition members may deposit crop and feed material at different levels and storage places spaced from the apparatus.

A distinctive feature of the apparatus shown in FIGS. 1–10 is the location of the feed opening in the blower in th third quadrant with the transition member or discharge opening in the second quadrant. This minimizes the time and length of travel of the crop or feed material in the blower and thereby substantially reduces the power losses of the blower due to the drawing of the material along the band or wrapper. This greatly increases the amount of material discharged by the blower for a given power input. Earlier introduction increases the power loss of the blower.

The horizontal rotor (107, 195, 268) has many distinct advantages. The circular open shape of the hopper permits the forage wagon or other vehicle loaded with the chopped crop material to be positioned around the periphery of the hopper over an angle of 90° to 100°. This means that the forage wagon can be positioned at the side of the apparatus or transverse to it. This provides a great versatility in the relation between the apparatus and the forage wagon. Often the contours of the ground adjacent to the silo or closeness of the buildings makes it difficult to position the forage wagon to the side as required by most of the present conventional forage blowers. some forage blowers have long augers or long feed conveyors which extend a substantial distance to the rear of the blower. These have the disadvantage of being longer and more cumbersome even though they may provide some additional positions for the forage wagon.

The cut crop is discharged directly onto the support plate of the rotor and there is no tendency for the cut crop material to cake or bridge above the rotor as in the case of augers or conveyors. The deposited material rotates with the support plate and is thrown outwardly to be discharged by the blades. The circular shape of the hopper avoids caking and bridging of the material. The blades have a metering effect so that although the hopper may be filed with crop material the rotor will select and impell the material at a given rate into the blower. This reduces the chance of a large mass of material being delivered to the blower at a given time. Further, the rotor breaks up clumps of material so that as the crop material is fed to the blower it is in a disintegrated airborne state. With the crop material in this condition it is easier for the fan to receive the material and propel it up through the transition member. Big chunks of crop material are also prevented from entering the material conveying means by the edge of the baffle. Thus oversize pieces of material cannot enter the blower. This has the advantage that the shear block on the trailing edge of the discharge opening of the blower is no longer needed and the blades may be spaced an adequate distance C from this trailing edge. This spacing eliminates the large source of the noise that is produced by the blower and the elimination of large clumps of crop material in the blower also smooths the operation of the apparatus.

The essential feature of the apparatus is that the horizontal impeller delivers disintegrated airborne crop material into the blower just preceding the transition member. This greatly reduces the work that the blower must do and thereby increases the material handled by the blower for a given power input. In the embodiment of FIGS. 11–13 the feed opening is in the fourth quadrant which increases the time and drag of the crop material in the blower. However, this embodiment has the other advantage of the other embodiments. The shear block has been eliminated for reduced noise. The horizontal impeller delivers disintegrated material to the blower for smooth operation and has an accessible circular shape for versatile positioning of forage wagons or the like. Also, the feed material does not cake or bridge and is fed continuously and smoothly to the blower.

While this invention has been described in connection with these embodiments, it will be understood that these embodiments are capable of modification and that this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A material conveying apparatus adapted to initially break up heavy clumps of received crop material and then impel the crop material into a blower and subsequently blow the crop material through a transition member to a silo or the like, said apparatus comprising:
 a frame;
 a blower housing mounted on the frame and including spaced apart vertically extending side walls, a wrapper and a transition member;
 a blower fan journalled for rotation within said housing about a generally horizontal axis spaced above an aperture in one of the spaced apart side walls;
 an open top hopper mounted on the frame in operative communication with the apertured side wall, said hopper comprising a bottom wall and crop confining means extending upwardly from said bottom wall to define an initial feed opening for receiving crop material dropped in the hopper;
 feed material transfer means extending tangentially from said hopper to the aperture in the apertured side wall, said feed material transfer means being a tubular structure and disposed at an acute angle relative to the apertured side wall;
 horizontal rotor means mounted within said hopper and having radially outwardly extending blades;
 said initial feed opening being open upwardly to permit crop material to be dumped directly onto a substantial portion of said rotor blades under conditions where said rotor is rotated about a vertical axis;
 means operable to rotate said rotor means at a speed sufficient to cause clumps of crop material engaged by said rotor means to be broken up and impelled in a generally tangential direction by said rotor means into the blower housing through said apertured side wall via said feed material transfer means, in a generally airborne state; and means operable to rotate said blower fan at a speed sufficient to cause crop material impelled into the blower housing to be blown through the transition member to a silo or the like.

2. A material conveying apparatus adapted to initially break up heavy clumps of received crop material and then impel the crop material into a blower, and subsequently blow the crop material through a transition member to a silo or the like, said apparatus comprising:

a frame;

a blower housing mounted on the frame and including spaced apart vertically extending side walls, a wrapper, and a transition member;

a blower fan journalled for rotation within said housing about a generally horizontal axis spaced above an aperture in one of the spaced apart side walls;

an open top hopper accessible from the top and mounted on the frame in operative communication with the apertured side wall;

feed material transfer mean extending from said hopper to the aperture in the apertured side wall, said feed material transfer means being disposed at an acute angle relative to the apertured side wall;

said hopper having a bottom wall member comprising a stationary feed table, a generally cylindrical wall extending therearound to define an initial feed opening for receiving crop material dropped in the hopper, and a discharge opening in said generally cylindrical wall above said bottom wall member for passing crop material to said feed material transfer means, said cylindrical wall providing feed material delivery positions over a substantial angle so that a wheeled vehicle can be positioned for discharge at a number of distinct positions;

horizontal rotor means having radially outwardly extending blades about a vertical axis for breaking up and impelling crop material via said transfer means through said discharge opening in a generally air-borne state;

said initial feed opening being open upwardly to permit crop material to be dumped directly onto a substantial portion of said rotor blades under conditions where said rotor is rotated about said vertical axis;

said feed material transfer means having a bottom wall extending from said feed table to said apertured side wall and two opposite side walls extending from said hopper discharge opening to said apertured side wall to confine and guide crop material delivered from said horizontal rotor means to said blower housing; and means operable to rotate said blower fan at a speed sufficient to cause crop material impelled into the blower housing to be blown through the transition member to a silo or the like.

3. In a material conveying apparatus as set forth in claim 2, wherein one of said side walls of said feed material transfer means is tangential to said cylindrical wall of said hopper, whereby said blades impel crop material in a generally tangential direction to said blower housing via said transfer means.

4. A material conveying apparatus adapted to initially break up heavy clumps of received crop material and then impel the crop material into a blower, and subsequently blow the crop material through a transition member to a silo or the like, said apparatus comprising:

a frame;

a blower housing mounted on the frame and including spaced apart vertically extending side walls, one of the side walls having an aperture therein, a wrapper for interconnecting said side walls, and a transition outlet member extending in a generally upward direction;

a blower fan journalled for rotation within said housing about a generally horizontal axis spaced above said aperture;

an open top hopper mounted on the frame in operative communication with the apertured side wall said hopper comprising a bottom wall and crop confining means extending upwardly from said bottom wall to define an initial feed opening for receiving crop material dropped in the hopper;

horizontal rotor means mounted within said hopper and having radially outwardly extending blades, said blades lying in a plane which is between the bottom and the top of the aperture in said one side wall;

said initial feed opening being open upwardly to permit crop material to be dumped directly onto a substantial portion of said rotor blades under conditions where said rotor is rotated about a vertical axis;

means operable to rotate said rotor means at a speed sufficient to cause clumps of crop material engaged by said rotor means to be broken up and impelled by said rotor means into the blower housing through said apertured side wall in a generally air-borne state; and means operable to rotate said blower fan at a speed sufficient to cause crop material impelled into the blower housing to be blown through the transition member to silos or the like.

5. Forage blower apparatus adapted to initially break up clumps of crop material, then throw the disintegrated crop material into a blower, and then blow the crop material through a transition pipe to a silo or the like, said apparatus comprising, in combination:

a. a support frame, b. a blower housing mounted on said frame and including spaced apart vertically extending side walls interconnected by a band and transition outlet member, c. a fan within said blower housing, journalled thereon for rotation about a generally horizontal axis and having crop engaging fan elements;

d. a drive for rotating said fan, e. said blower housing having an infeed opening in one of said side walls and below the axis of said fan through which crop material may be admitted to the housing in the path of movement of said fan elements, f. a hopper comprising a bottom wall and crop confining means extending upwardly from said bottom wall to define an initial feed opening for receiving crop material dropped in the hopper, said hopper being in operative communication with said infeed opening, g. a rotor mounted adjacent the bottom wall of said hopper and journalled on a generally vertical axis, h. said rotor having a plurality of angularly spaced blades thereon extending in a radial direction and each blade traveling in a horizontal plane that passes through said infeed opening, i. said initial feed opening being open upwardly to permit crop material to be dumped directly onto a substantial portion of said rotor blades under conditions where said rotor is rotated about said vertical axis, j. drive means operable to rotate said rotor at sufficient speed to cause clumps of crop material engaged by said rotor blades to be broken up and then thrown horizontally and radially by said blades, and k. wall means cooperative with said rotor blades to guide the crop material thrown by said rotor blades into said blower housing through said infeed opening of the sidewall of said blower housing, l. the velocity imparted to the crop material by said rotor blades facilitating the subsequent engagement of the material by said fan elements for discharge to the silo.

6. A forage blower apparatus as set forth in claim 5, wherein said infeed opening is in the quadrant of said blower housing at the commencement of the upward movement of said blower fan.

7. A forage blower apparatus as set forth in claim 5, wherein said infeed opening is in the quadrant of said blower housing where said blower fan is completing its downward movement.

8. A forage blower apparatus as set forth in claim 5, further characterized by the provision of a feed material transfer means extending from said hopper to the infeed opening in one of said side walls, said feed material transfer means being disposed at an acute angle relative to said one of said side walls, whereby crop material is thrown by said rotor means into the blower housing via the feed material transfer means.

9. A forage blower apparatus as set forth in claim 8, wherein said horizontal plane through which said blades travel is parallel to said feed table, said feed material transfer means has an impervious floor and spaced apart material confining walls, and the floor of the feed material transfer means lies in the same plane and is co-extensive with the bottom wall of said hopper.

10. Crop conveying apparatus comprising in combination:

1. a forage blower including
   a. a housing having spaced side walls and a generally cylindrical wrapper joining the spaced walls, one of said side walls being provided with an infeed aperture in the lower portion of said one side wall and in the vicinity of said wrapper,
   b. drive means,
   c. a fan operably coupled to said drive means and mounted within said housing for rotation about a generally horizontal axis and having crop engaging fan blades, a portion of which traverse a generally circular path past said infeed aperture and in the vicinity of said wrapper,
   d. a discharge member through which crop material engaged by said fan blades may be discharged, and 2. means for feeding crop material into the forage blower including
   a. a crop receiving hopper having a bottom wall and crop confining side wall means extending upwardly therefrom to define an initial feed opening for receiving crop material dropped in the hopper, said side wall means having a discharge opening therein;
   b. means for mounting said hopper adjacent said infeed aperture in said blower side wall,
   c. transfer means for guiding said crop material between said discharge opening and said aperture,
   d. a rotor rotatably mounted within said hopper to impel crop material deposited within said hopper to said blower housing,
   e. said rotor comprising a plurality of blades each having a crop material contacting surface extending generally upwardly from said hopper bottom wall at least to a substantially horizontal plane that passes through said aperture and said opening, means for supporting said blades in a spaced radial array and means for journalling said support means for rotation about a generally vertical axis through said bottom wall of said hopper,
   f. said initial feed opening being open upwardly to permit crop material to be dumped directly onto a substantial portion of said rotor blades under conditions where said rotor is rotated about said vertical axis, and
   g. said drive means further comprising means for driving said rotor at a relatively high speed to permit said blades to engage crop material and impel it in a direct path out of said hopper via said discharge opening and through said infeed aperture in a generally air-borne state whereby said transfer means cooperate with said rotor to guide the material into the path of said fan blades with an initial velocity in the direction of rotation of said fan blades.

11. A crop conveying apparatus as set forth in claim 10, wherein said transfer means comprises a plurality of walls forming a passageway from said opening to the infeed aperture and said material transfer means is disposed at an acute angle relative to said one side wall, whereby said crop material impelled by said rotor is delivered through the passageway of said transfer means in a generally air-borne state.

12. A crop conveying apparatus as set forth in claim 11, wherein said rotor is mounted above said hopper bottom wall and lying in a plane parallel thereto, said transfer means walls include an impervious floor, said floor is in the same plane and is co-extensive with the hopper bottom wall.

* * * * *

UNITED STATES PATENT OFFICE
CERTIFICATE OF CORRECTION

Patent No. 3,968,897         Dated July 13, 1976

Inventor(s) Robert E. Rodgers

It is certified that error appears in the above-identified patent and that said Letters Patent are hereby corrected as shown below:

Column 3, delete lines 29-36, both inclusive.

Column 5, line 29, delete "defining" (second occurrence).

Column 6, line 8, after "vehicle" and before "tanks" insert -- fuel --; line 13, after "disposed" and before "at" insert -- at --; line 15, "haveing" should be -- having --.

Signed and Sealed this

Twenty-eighth Day of September 1976

[SEAL]

Attest:

RUTH C. MASON
Attesting Officer

C. MARSHALL DANN
Commissioner of Patents and Trademarks